Figure 1:
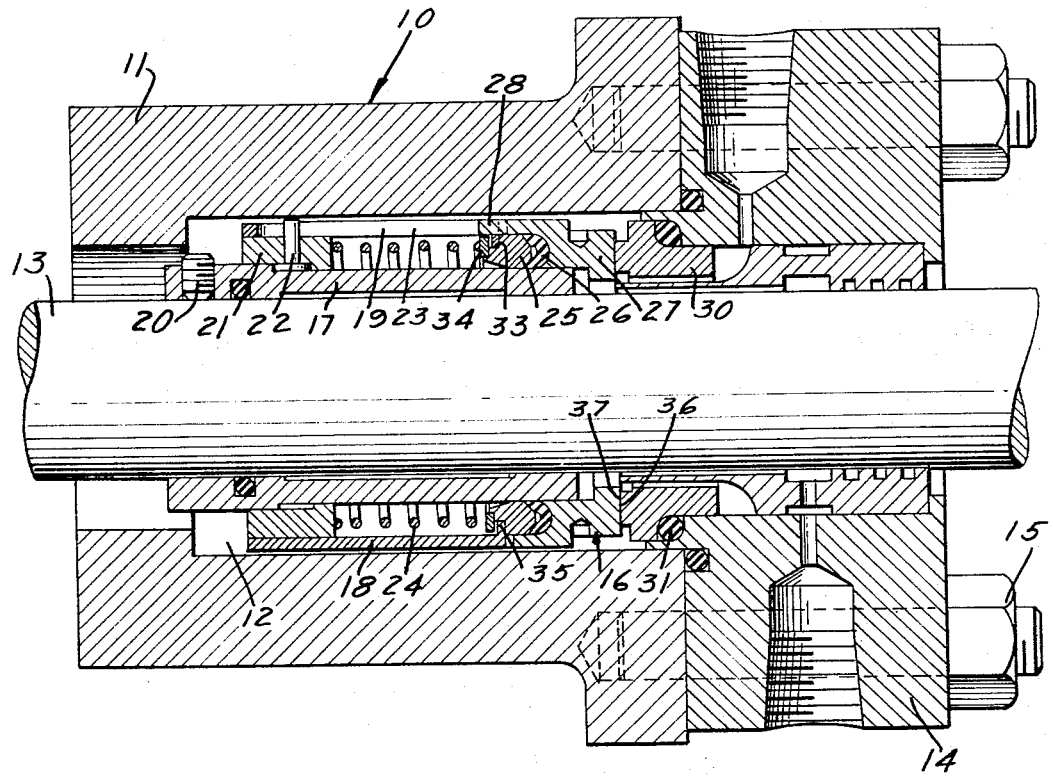

Jan. 10, 1967    H. E. TRACY    3,297,331
MECHANICAL SEAL WITH IMPROVED SPRING HOLDER
Filed July 24, 1963

Herbert E. Tracy,
INVENTOR.

3,297,331
MECHANICAL SEAL WITH IMPROVED
SPRING HOLDER
Herbert E. Tracy, Alhambra, Calif., assignor to Borg-Warner Corporation, Chicago, Ill., a corporation of Illinois
Filed July 24, 1963, Ser. No. 297,285
3 Claims. (Cl. 277—30)

This invention relates in general to mechanical seals adapted to prevent leakage of fluid under pressure from between a housing and a rotating shaft, and relates in particular to a new and improved mechanical seal assembly incorporating a new spring holder, whereby the seal has an improved operation to accommodate vibration, misalignment and run-out.

Mechanical seals, or rotary seals as they are sometimes called, usually comprise parts which include one or more rings which are held stationary with respect to the housing, and parts which include one or more rings which are fixed for rotation on or with the shaft. Each sealing ring, sometimes called sealing elements or means, is provided with a face which opposes another face of another sealing ring and arranged so that in response to either fluid pressure or spring pressure, or both, there is a sealing relationship between these opposed faces to form a seal to prevent leakage along the shaft. This sealing relationship does not necessarily mean that these opposing sealing faces are in direct contacting relationship with one another, but that a small lubricating film of fluid is permitted between these faces to prevent or reduce (in the case of metal rings) direct metal-to-metal contact therebetween.

In the mechanical seal to which this invention pertains, it has been common practice to provide a spring holder as one of the parts which rotate with the shaft and it is customary that this spring holder form an integral part with an expander ring, the latter urging an expandable seal or packing ring in response to the action of a helical spring in unison with the rotating sealing ring above-mentioned. The rotating sealing ring is also drivingly coupled to this spring holder for direct rotational drive with the shaft.

It has been found that the operation of this expander ring can be improved by separating the expander ring from the spring holder, so that the former has limited axial movement and free rotational movement. In this manner, vibration run out of the shaft because of its cantilevered extension and misalignment of the various parts can be better accommodated.

Accordingly, it is a general object of this invention to improve mechanical seal assemblies by providing a new and improved expander ring and spring holder assembly so that the seal can better accommodate vibration, misalignment and run-out.

It is a particular object of this invention to provide in a mechanical seal, an expander ring which is articulately attached to a spring holder so that the expander ring has limited axial movement and free rotational movement to accommodate vibration, misalignment and run-out.

Figure 2:
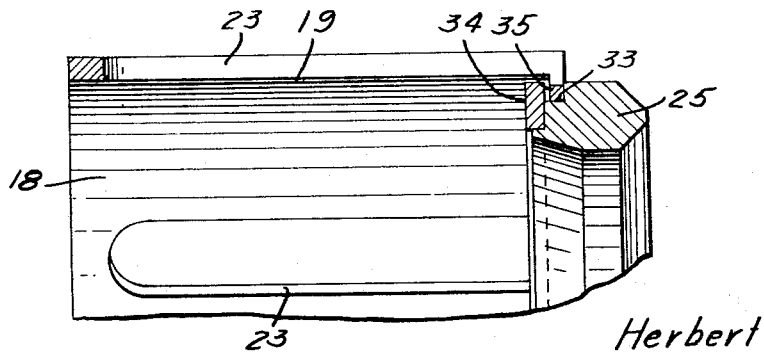

These and other objects of this invention will become apparent from the following description as taken in conjunction with the drawings, in which FIGURE 1 is a longitudinal sectional view of a mechanical seal constructed in accordance with the teachings of this invention; and FIGURE 2 is a fragmentary sectional view enlarged to show the articulate connection between the expander ring and the sleeve-like extension of the spring holder.

Turning now to the drawings, it can be seen that there is illustrated therein a mechanical or rotary seal indicated in its entirety as 10, and comprising a housing 11 formed of part of another housing (not shown) in which fluid under pressure is being pumped, and having an inner bore 12 in which is disposed a rotatable shaft 13 in spaced relationship therewith.

The housing 11 has a flange 14 suitably attached thereto as by bolt means 15. A rotatable sealing means 16 is suitably attached to shaft 13 for rotation therewith; the attaching means in this embodiment comprises a sleeve 17 which fits over the shaft 13 and over which a cup-like spring holder 18 is telescoped. Sleeve 17 is fixed to the shaft by threaded pins 20, and spring holder 18 and its extension 19, which form a sleeve member, are fixed for rotation with sleeve 17 by means of a collar 21, in which are fitted pins 22 which extend radially outwardly through longitudinal slots 23 in the spring holder. The sleeve 17 provides a means for adjustably fitting the spring holder to the shaft to accommodate variations in the size of the spring holder and the shaft, in accordance with good engineering practice. A helical spring 24 which encompasses the sleeve 17 urges an expander ring member 25 and cup-like seal 26 towards a rotary sealing ring 27. The sealing ring 27 is provided with tangs 28 which are inserted in the slots 23 so as to drivingly connect the sealing ring 27 to the spring holder 18 which in turn, as described above, is drivingly connected to the shaft 13.

The non-rotatable or stationary sealing means 30 is held in housing 11 against rotation in any suitable manner and in fluid-tight sealing engagement with the flange 14 by O-ring seal 31.

It is to be understood that the means for attaching the rotating spring holder to the shaft and the means for attaching the non-rotating sealing means to the housing may vary, such means as disclosed herein being one practical embodiment of such means as illustrative of the attaching means in its broad sense, and this invention is directed towards the articulate connection between the expander ring 25 and the extension 19 of spring holder 18, as will be described more fully hereinafter.

Turning now to FIG. 2, it can be seen that the expander ring 25 is provided on its outer periphery with a groove 33, which is formed by the expander ring 25 and a retaining ring 34 suitably attached as by welding to the side of the ring adjacent the helical spring 24.

The spring holder extension 19 is provided with a radially inwardly extending flange 35 which loosely fits into the groove 33 a depth sufficient to connect the expander ring to the extension but permit limited axial movement and free rotational movement of the expander ring with respect to the extension. This articulate connection between the extension and the expander ring permits any vibration or misalignment of the seal and ring 27, as well as any misalignment of the spring holder 23, sleeve 17, etc. This also helps to improve the operation of the mechanical seal by accommodating vibration induced by the pump, which otherwise would be transferred from the spring holder to the articulate connection were it not for the loose fitting or articulate connection therebetween.

From the above description, it can be seen that fluid under pressure from the remainder of the housing is permitted to flow into the bore 12, but is prevented from leaking along the shaft by the sealing rings 27 and 30. As is conventional, these sealing rings have opposing radial faces 36 and 37 and, as mentioned above, any tendency for leakage to be increased beyond the amount required for operation of seals of this type, which might be induced by reason of vibration, misalignment or run-out, is greatly reduced.

While the various parts herein have been described as upper and lower or in a right or left position, such description refers only to the relative position of the parts as shown in the drawing and is not intended to be a limitation of the invention; it being understood that the

What is claimed is:

1. For use in an assembly for sealing a rotating shaft within a housing, the improvement comprising:
   an articulated spring-holder assembly including an expander ring adapted to engage a seal, said ring being subject to a helical spring;
   a housing enclosing said helical spring;
   and means for articulately connecting said expander ring to said housing so that said seal assembly accommodates vibration, misalignment and run-out including:
   a shoulder on said expander ring;
   a retaining ring on said expander ring and defining with said shoulder a peripheral groove; and
   a flange on said housing loosely received in said groove.

2. For use in an assembly for sealing a rotating shaft within a housing, the improvement comprising:
   (a) a sleeve member adapted to surround the shaft;
   (b) means on said sleeve member cooperable with means on the shaft for rotating said sleeve member as a unit with the shaft, while permitting longitudinal movement of said sleeve member on the shaft;
   (c) an expander ring member coaxial with said sleeve member and adapted to surround the shaft, said ring member being adapted to move axially of the shaft into engagement with a seal between the shaft and a ring-shaped seal surrounding the shaft to expand the seal into sealing engagement with the sealing ring and the shaft; and
   (d) means for connecting said expander ring member to said sleeve member for limited axial movement and free rotational movement with respect to said sleeve member to accommodate vibration, misalignment and run-out;
   (e) said last mentioned means comprising a shoulder on said expander ring member, a retaining ring on said expander ring member and defining with said shoulder a peripheral groove, and a circumferential flange on said sleeve member loosely received in said groove.

3. An assembly for sealing a rotating shaft within a housing having a shaft opening through which the shaft extends comprising:
   (a) a stationary sealing ring sealed to the housing and coaxial with the shaft;
   (b) a rotatable sealing ring mounted coaxially on the shaft and slidable longitudinally on the shaft into sealing relation with said stationary sealing ring;
   (c) a ring-shaped seal between said rotatable sealing ring and the shaft;
   (d) an expander ring member mounted coaxially on the shaft and slidable longitudinally on the shaft into engagement with said ring-shaped seal to expand said seal into sealing engagement with said rotatable sealing ring and the shaft;
   (e) resilient means for urging said expander ring member into said engagement with said ring-shaped seal;
   (f) a sleeve member mounted coaxially on the shaft and slidable longitudinally on the shaft;
   (g) means on said sleeve member cooperable with means on the shaft for rotating said sleeve member with the shaft, while permitting said sleeve member to slide longitudinally on the shaft;
   (h) means for connecting said sleeve member to said rotatable sealing ring for driving the latter while permitting relative longitudinal movement of said sleeve member and said rotatable sealing ring; and
   (i) means for connecting said expander ring member to said sleeve member for limited axial movement and free rotational movement of said expander ring member with respect to said sleeve member to accommodate vibration, misalignment and run-out;
   (j) said last mentioned means comprising a shoulder on said expander ring member, a retaining ring on said expander ring member and defining with said shoulder a peripheral groove, and a circumferential flange on said sleeve member loosely received in said groove.

References Cited by the Examiner

UNITED STATES PATENTS

| | | | |
|---|---|---|---|
| 2,928,685 | 3/1960 | Tracy | 277—68 X |
| 3,015,506 | 1/1962 | Tracy | 277—22 X |
| 3,184,244 | 5/1965 | Van Fleet | 277—83 |
| 3,188,095 | 6/1965 | Van Fleet | 277—83 X |

LAVERNE D. GEIGER, *Primary Examiner.*

J. MEDNICK, *Assistant Examiner.*